United States Patent [19]
Yu

[11] Patent Number: 5,808,816
[45] Date of Patent: Sep. 15, 1998

[54] SLAT FOR A SHUTTER WITH A LENS

[76] Inventor: Jackson Yu, 2F, No. 2, Chung-Hua St., Pei-Tou Dist., Taipei, Taiwan

[21] Appl. No.: 794,593

[22] Filed: Feb. 3, 1997

[51] Int. Cl.$^6$ .............................. G02B 3/00; G02B 7/02; B60Q 9/00; B42D 9/00

[52] U.S. Cl. ........................... 359/810; 359/819; 160/32; 160/236

[58] Field of Search ..................................... 359/808, 809, 359/810, 811, 819; 160/32, 236, 297

[56] References Cited

U.S. PATENT DOCUMENTS

| | | | |
|---|---|---|---|
| 4,126,173 | 11/1978 | Theuerkauff | 160/229 |
| 4,893,667 | 1/1990 | Dunn | 160/236 |
| 5,236,260 | 8/1993 | Yu | 312/297 |
| 5,507,335 | 4/1996 | Yu | 160/235 |
| 5,560,416 | 10/1996 | Yu | 160/229.1 |

Primary Examiner—Georgia Y. Epps
Assistant Examiner—Ricky Mack
Attorney, Agent, or Firm—Oblon, Spivak, McClelland, Maier & Neustadt, P.C.

[57] ABSTRACT

A slat for a shutter includes an elongated slat body with a longitudinal slot unit formed therethrough, and an elongated lens fixed within the slot unit so as to close the slot unit and so as to permit light from one side of the shutter to reach the other side of the utter via the slot unit and the lens.

3 Claims, 4 Drawing Sheets

5,808,816

1

SLAT FOR A SHUTTER WITH A LENS

BACKGROUND OF THE INVENTION

1. Field of the Invention

This invention relates to a shutter, which functions as a flexible door for a cabinet, more particularly to a slat for a shutter which has a lens via which items stored in the cabinet are visible.

2. Description of the Related Art

Cabinets which are used for storing some disks therein are normally made of opaque material, thereby creating some difficulty in identifying the disks therein. Such a cabinet has a shutter which functions as a flexible door so as to prevent entry of dust and contaminants into the interior of the cabinet, thereby facilitating maintenance of the cabinet. Although a label can assist the user in finding desired disks in a cabinet, it is time-consuming to put a disk into a predetermined place indicated by the label attached to the outer surface of the cabinet. A transparent shutter may be provided to solve the above problem. However, it is expensive to manufacture a transparent shutter. Furthermore, the means for interconnecting the slats of the transparent shutter is usually opaque and shades the transparent slats in use, thereby reducing the light-permeability of the slats.

SUMMARY OF THE INVENTION

An object of this invention is to provide a slat for a shutter of a disk-storing cabinet, which is provided with a lens via which the disks in the cabinet are visible from the outside of the cabinet.

According to this invention, a slat for a shutter includes an elongated slat body with a longitudinal slot unit formed therethrough, and an elongated lens fixed within the slot unit so as to close the slot unit and so as to permit light from one side of the shutter to reach the other side of the shutter via the slot unit and the lens.

BRIEF DESCRIPTION OF THE DRAWINGS

Other features and advantages of this invention will become apparent in the following detailed description of the preferred embodiment of this invention with reference to the accompanying drawings, in which.

DETAILED DESCRIPTION OF THE PREFERRED EMBODIMENTS

Figure 1:
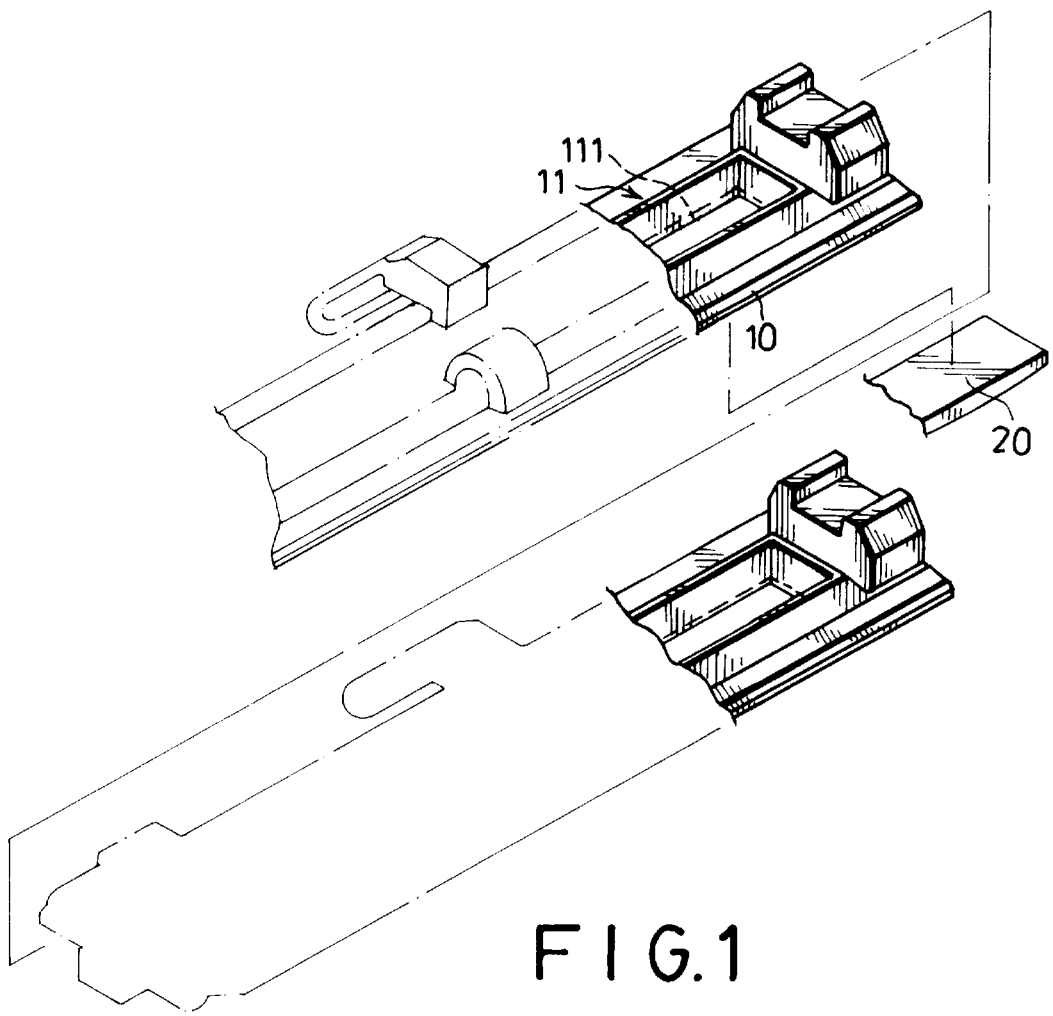
FIG. 1 illustrates a slat according to a first embodiment of this invention.
Figure 2:
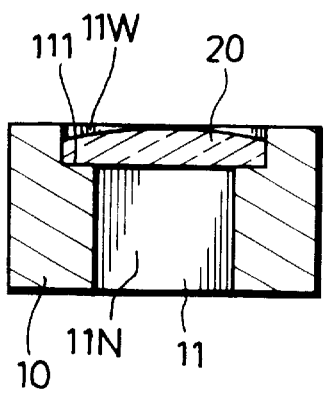
FIG. 2 is a cross-sectional view showing the slat according to the first embodiment of this invention.

Referring to FIGS. 1 and 2, a slat of a first embodiment of this invention includes an elongated slat body 10 and an elongated magnifying lens 20 which has two opposite side portions and a middle portion that is located between and thicker than the side portions. The slat body 10 has a slot unit

2

11 which is formed therethrough and which has a T-shaped cross-section, as best shown in FIG. 2. The slot unit 11 consists of a narrow portion 11N and a wide portion 11W between which a shoulder 111 is formed. The lens 20 is adhered to the shoulder 111 at two sides thereof and is received entirely within the wide portion 11W so as to minimize wearing of the lens 20.

Figure 3:
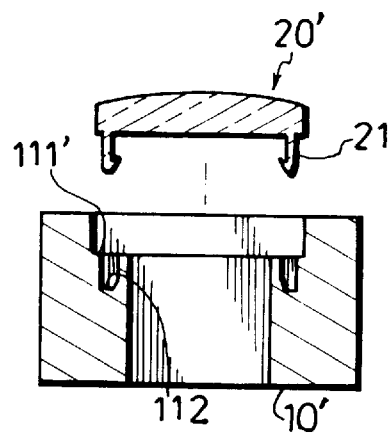
FIG. 3 is a cross-sectional view showing a slat according to a second embodiment of this invention.

FIG. 3 illustrates a cross-section of a second embodiment of this invention which is similar to the first embodiment in construction except for the manner in which the lens is retained on the slat body 10'. As illustrated, the shoulder 111' of the slat body 10' is formed with two elongated parallel grooves 112 in two opposite sides of the slat body 10'. The lens has a generally U-shaped cross-section which consists of an elongated lens body 20' and two tongue sheets 21 projecting integrally from the lens body 20' into the grooves 112. Each of the tongue sheets 21 has a barb-shaped-cross-sectioned portion which is press fitted within the corresponding groove 112 so as to retain the lens on the slat body 10'.

Figure 4:
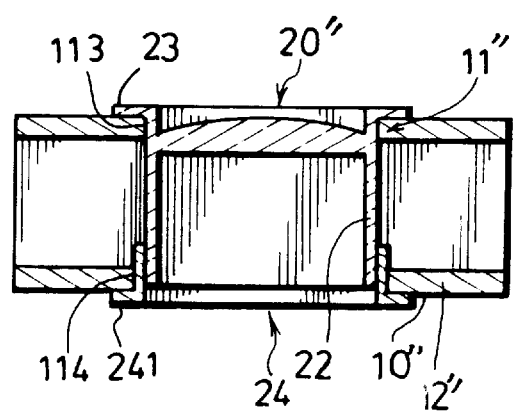
FIG. 4 is a cross-sectional view showing a slat according to a third embodiment of this invention.

FIG. 4 is a cross-sectional view of a third embodiment which includes a lens 20" and a hollow slat body 10" consisting of a first plate 11" and a second plate 12" that are integrally formed with each other and that are elongated and parallel to each other. The first plate 11" has an elongated small hole 113 formed therethrough. The second plate 12" has an elongated large hole 114 which is formed therethrough and which is wider than the small hole 113. The lens 20" is integrally formed at the outer periphery thereof with a surrounding wall 22 which extends through the small hole 113 of the first plate 11" to a position aligned with the second plate 12" and which has an L-shaped cross-section with a corner that is press fitted within the small hole 113, in such a manner that the surrounding wall 22 has an outwardly extending flange 23 which abuts against the outer surface of the first plate 113. In this embodiment, an annular retainer 24 which extends through the large hole 114 of the second plate 12" and which has an L-shaped cross-section with a corner that is press fitted within the large hole 114. The surrounding wall 22 is press fitted within the annular retainer 24. The annular retainer 24 has an outwardly extending flange 241 which abuts against the outer surface of the second plate 12".

Figure 5:
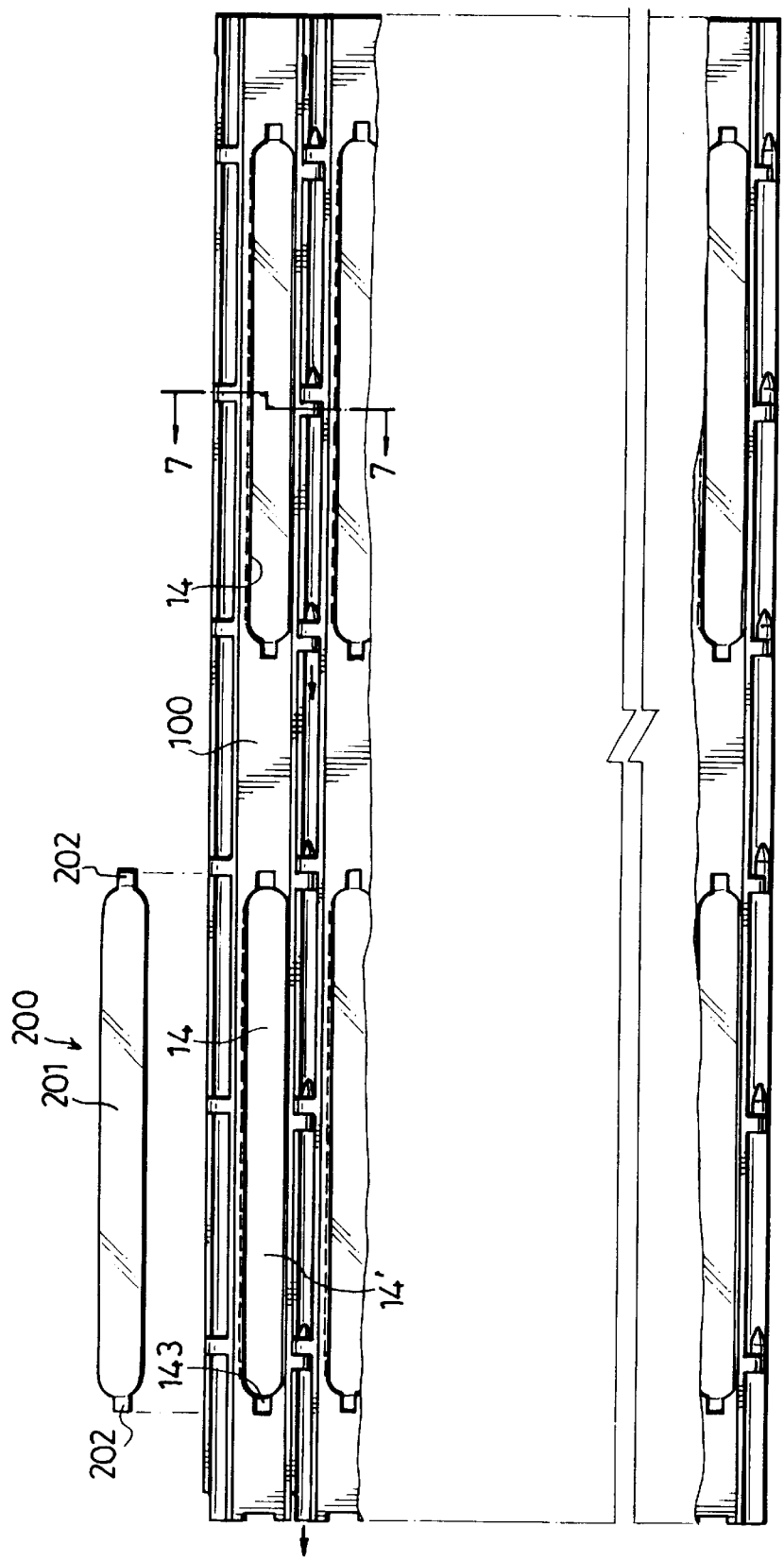
FIGS. 5 and 6 illustrate a slat according to a fourth embodiment of this invention.
Figure 6:
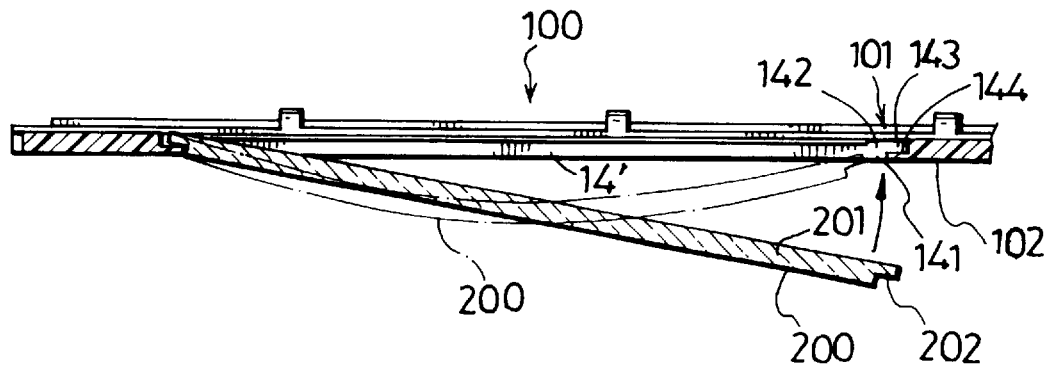
Figure 7:
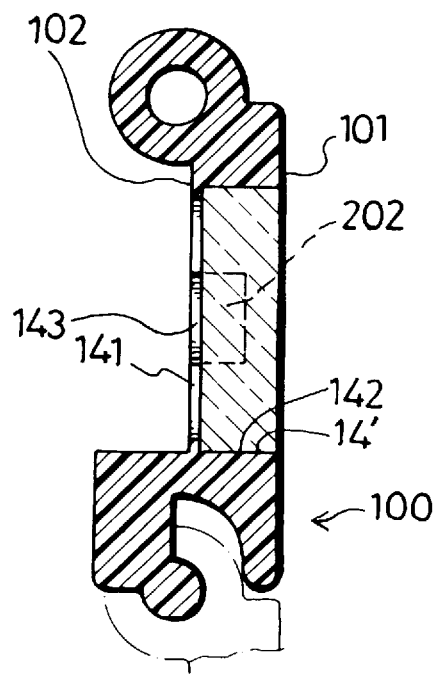
FIG. 7 is a sectional view taken along Line 7—7 in FIG. 5.

FIGS. 5, 6 and 7 illustrate a fourth embodiment of this invention which is a flexible door for a cabinet storing two vertical tiers of disks therein, and which has a slat body 100 formed with two slot units 14 within which two flexible lenses 200 (only one is shown in FIG. 5) are respectively retained. The slat body 100 has an outer side surface 101 and an inner side surface 102. The slot unit 14 has a main body 14' of a cross-section which consists of a narrow portion 141 and a wide portion 142 that is wider than the narrow portion 141. The narrow portion 141 is formed in the inner side surface 102, while the wide portion 142 is formed in the outer side surface 101. Each of the slot units 14 further has two longitudinal extensions 143 which respectively extend from two ends of the main body 14' of the slot unit 14 and which are in the form of a blind hole formed in the inner side surface 102 of the slat body 100. That is to say, the extensions 143 are defined by bottom walls 144 (see FIG. 6). The longitudinal extensions 143 of the slot units 14 are narrower than the narrow portions 141. Each of the lenses 200 has an elongated lens body 201 which is received within the wide portion 142 of the corresponding slot unit 14 and which is slightly narrower than the wide portions 142 and wider than the narrow portions 141, and two longitudinal extensions 202 which respectively extend from two ends of the lens body 201 and which are narrower than the lens body 201. The extensions 201 of the lenses 200 are inserted into the extensions 143 of the slot units 14 so as to retain the lenses 200 on the slat body 100. It is noted that, in assembly, as shown in FIG. 6, the flexible lenses 200 are bent into a curved structure indicated by the phantom lines so as to insert the extensions 202 of the lenses 200 into the extensions 143 of the slot units 14 from the inner side surface 102 of the slat body 100.

With this invention thus explained, it is apparent that numerous modifications and variations can be made without departing from the scope and spirit of this invention. It is therefore intended that this invention be limited only as indicated in the appended claims.

I claim:

1. A slat for a shutter, comprising an elongated slat body with a longitudinal slot unit formed therethrough and an elongated lens fixed within the slot unit so as to close the slot unit and so as to permit light from one side of the shutter to reach the other side of the shutter via the slot unit and the lens;

wherein the slot unit has a generally T-shaped cross-section which consists of a narrow portion and a wide portion between which a shoulder is formed, the shoulder being formed with two elongated parallel grooves in two opposite sides of said slat body, the lens having a generally U-shaped cross-section which consists of an elongated lens body and two tongue sheets projecting integrally from the lens body into the grooves, each of the tongue sheets having a barb-shaped-cross-sectioned portion which is press fitted within a corresponding one of the grooves so as to retain the lens on the slat body.

2. A slat as claimed in claim 1, wherein the slat body is hollow and has a first plate and a second plate which are integrally formed with each other and which are elongated and parallel to each other, the first plate having an elongated small hole formed therethrough, the second plate having an elongated large hole which is formed therethrough and which is wider than the small hole, the lens being integrally formed at an outer periphery thereof with a surrounding wall which extends through the small hole of the first plate to a position aligned with the second plate and which has an L-shaped cross-section with a corner that is press fitted within the small hole, the surrounding wall having an outwardly extending flange which abuts against an outer surface of the first plate, the slat further including an annular retainer which extends through the large hole of the second plate and which has an L-shaped cross-section with a corner that is press fitted within the large hole, the surrounding wall being press fitted within the annular retainer, the annular retainer having an outwardly extending flange which abuts against an outer surface of the second plate.

3. A slat as claimed in claim 1, wherein the slat body has an outer side surface and an inner side surface, the slot unit having a main body of a cross-section which consists of a narrow portion and a wide portion that is wider than the narrow portion, the narrow portion being formed in the inner side surface, the wide portion being formed in the outer side surface, the slot unit further having two longitudinal extensions which respectively extend from two ends of the main body of the slot unit and which are in the form of a blind hole formed in the inner side surface of the slat body, the longitudinal extensions of the slot unit being narrower than the narrow portion, the lens being flexible and having an elongated lens body which is received within the wide portion of the slot unit and which is slightly narrower than the wide portion of the slot unit and wider than the narrow portion of the slot unit, and two longitudinal extensions which respectively extend from two ends of the lens body and which are narrower than the lens body, the extensions of the lens being inserted into the extensions of the slot unit so as to retain the lens on the slat body.

\* \* \* \* \*